United States Patent
Piper et al.

(10) Patent No.: US 10,773,315 B2
(45) Date of Patent: Sep. 15, 2020

(54) CUTTING DEVICE HAVING A PIN ENGAGING RAMP

(71) Applicant: Greenlee Tools, Inc., Rockford, IL (US)

(72) Inventors: Arthur Anton Piper, Loves Park, IL (US); Kevin Tews, North Aurora, IL (US)

(73) Assignee: GREENLEE TOOLS, INC, Rockford, IL (US)

( * ) Notice: Subject to any disclaimer, the term of this patent is extended or adjusted under 35 U.S.C. 154(b) by 0 days.

(21) Appl. No.: 16/411,467

(22) Filed: May 14, 2019

(65) Prior Publication Data

US 2019/0358713 A1 Nov. 28, 2019

Related U.S. Application Data

(60) Provisional application No. 62/674,613, filed on May 22, 2018.

(51) Int. Cl.
*B23B 51/04* (2006.01)
*B23B 31/107* (2006.01)
*B23B 31/00* (2006.01)
*B23B 31/11* (2006.01)

(52) U.S. Cl.
CPC ........ *B23B 31/1074* (2013.01); *B23B 31/005* (2013.01); *B23B 31/11* (2013.01); *B23B 51/0426* (2013.01); *B23B 2205/04* (2013.01); *B23B 2251/606* (2013.01)

(58) Field of Classification Search
CPC .............. B23B 31/1074; B23B 31/005; B23B 51/0426; B23B 31/11; B23B 2205/04; B23B 2251/606; B23B 51/0473
See application file for complete search history.

(56) References Cited

U.S. PATENT DOCUMENTS

| | | | |
|---|---|---|---|
| 3,880,546 A | 4/1975 | Segal | |
| 3,973,862 A * | 8/1976 | Segal | B23B 31/113 408/204 |
| 9,248,514 B2 | 2/2016 | Piper et al. | |
| 2015/0071721 A1* | 3/2015 | Piper | B23B 51/0426 408/204 |

* cited by examiner

*Primary Examiner* — Sunil K Singh
*Assistant Examiner* — Paul M Janeski
(74) *Attorney, Agent, or Firm* — Klintworth & Rozenblat IP LLP

(57) ABSTRACT

A cutting device in accordance with some example embodiments is provided for use with an arbor assembly. The cutting device includes a blade having a plurality of teeth, and a back plate at a proximal end of the blade. The back plate has an outer end surface in which a plurality of ramp surfaces and pin locking recess are provided. A central through hole extending through the back plate. The ramp surfaces only allow the cutting device to be rotated relative to the arbor assembly in one direction.

14 Claims, 9 Drawing Sheets

CUTTING DEVICE HAVING A PIN ENGAGING RAMP

FIELD OF THE DISCLOSURE

The present disclosure relates to a cutting device, such as a hole or a circular type saw, having a pin sleeve ramp for positioning an arbor assembly in relation to a cutter head for ease in assembly.

BACKGROUND

U.S. Pat. No. 3,880,546 discloses a prior art hole saw assembly which includes a hole saw and an arbor assembly. The hole saw includes a ramp having a slot therein which is used to lock the hole saw to the arbor assembly. The arbor assembly includes a pin extending from a pin sleeve, which has a shank extending from the pin sleeve and an enlarged head at the free end thereof. The enlarged head passes through an enlarged portion of the slot in the hole saw and engages behind the ramp. To maintain the hole saw on the arbor assembly, the operator twists the hole saw and the arbor assembly in opposite directions, the enlarged head travels along the ramp, until the pin sleeve is secured to the hole saw.

SUMMARY

A cutting device in accordance with example embodiments is provided for use with an arbor assembly. The cutting device includes a blade having a plurality of teeth, and a back plate at a proximal end of the blade. The back plate has an outer end surface in which a plurality of ramp surfaces and pin locking recess are provided. A central through hole extending through the back plate. The ramp surfaces only allow the cutting device to be rotated relative to the arbor assembly in one direction.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
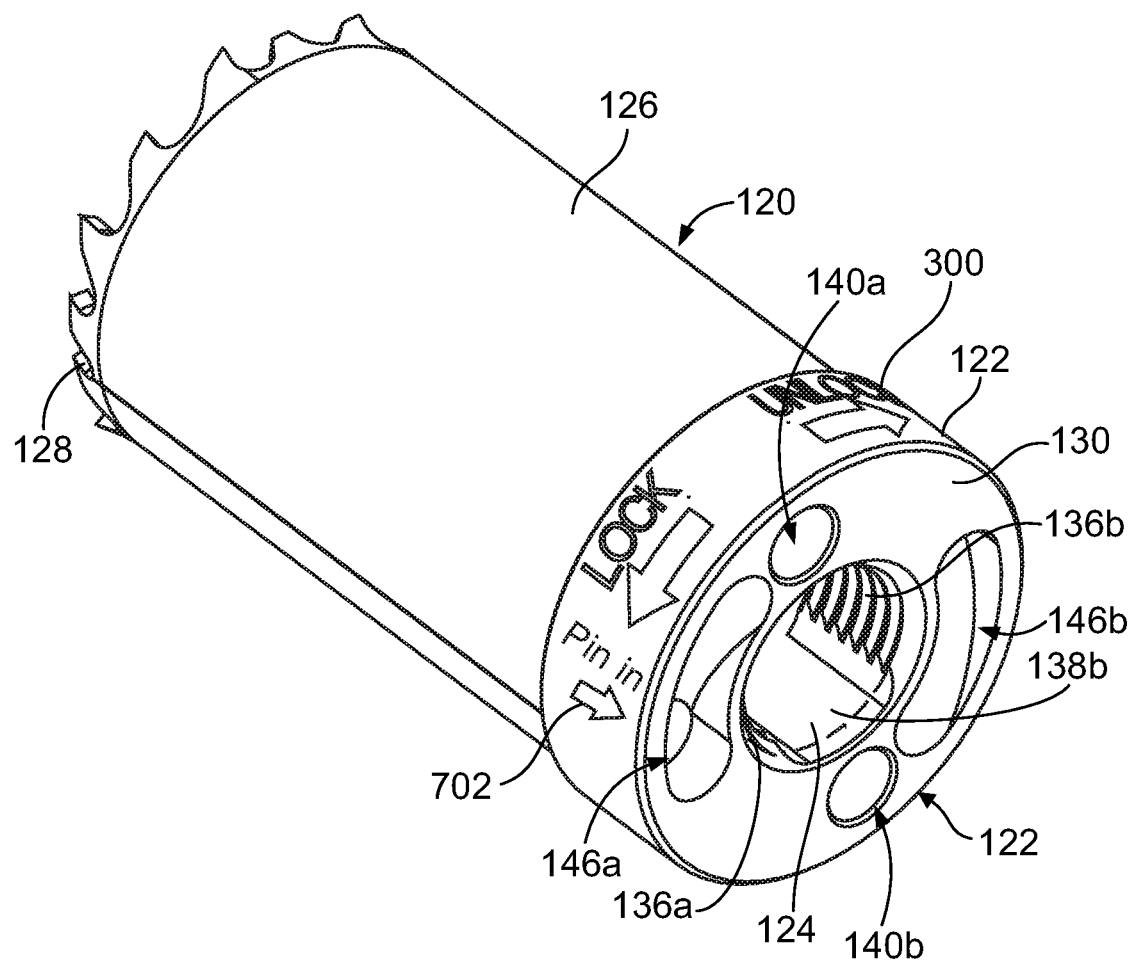
FIG. 1 depicts a perspective view of a cutting device in accordance with an embodiment of the present disclosure, shown from the proximal end of the cutting device.
Figure 2:
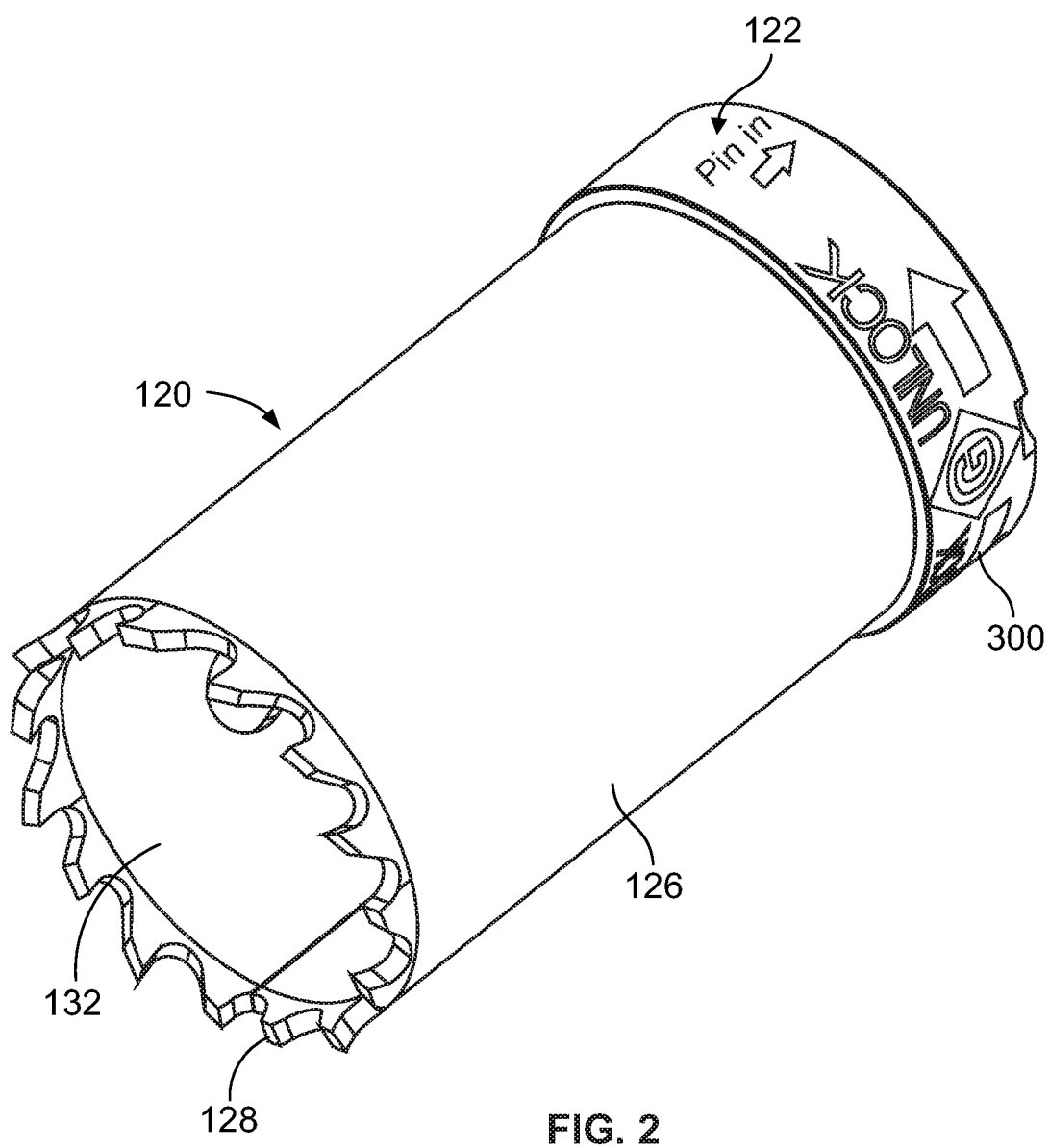
FIG. 2 depicts an alternate perspective view of the cutting device, shown from the distal end of the cutting device.
Figure 3:
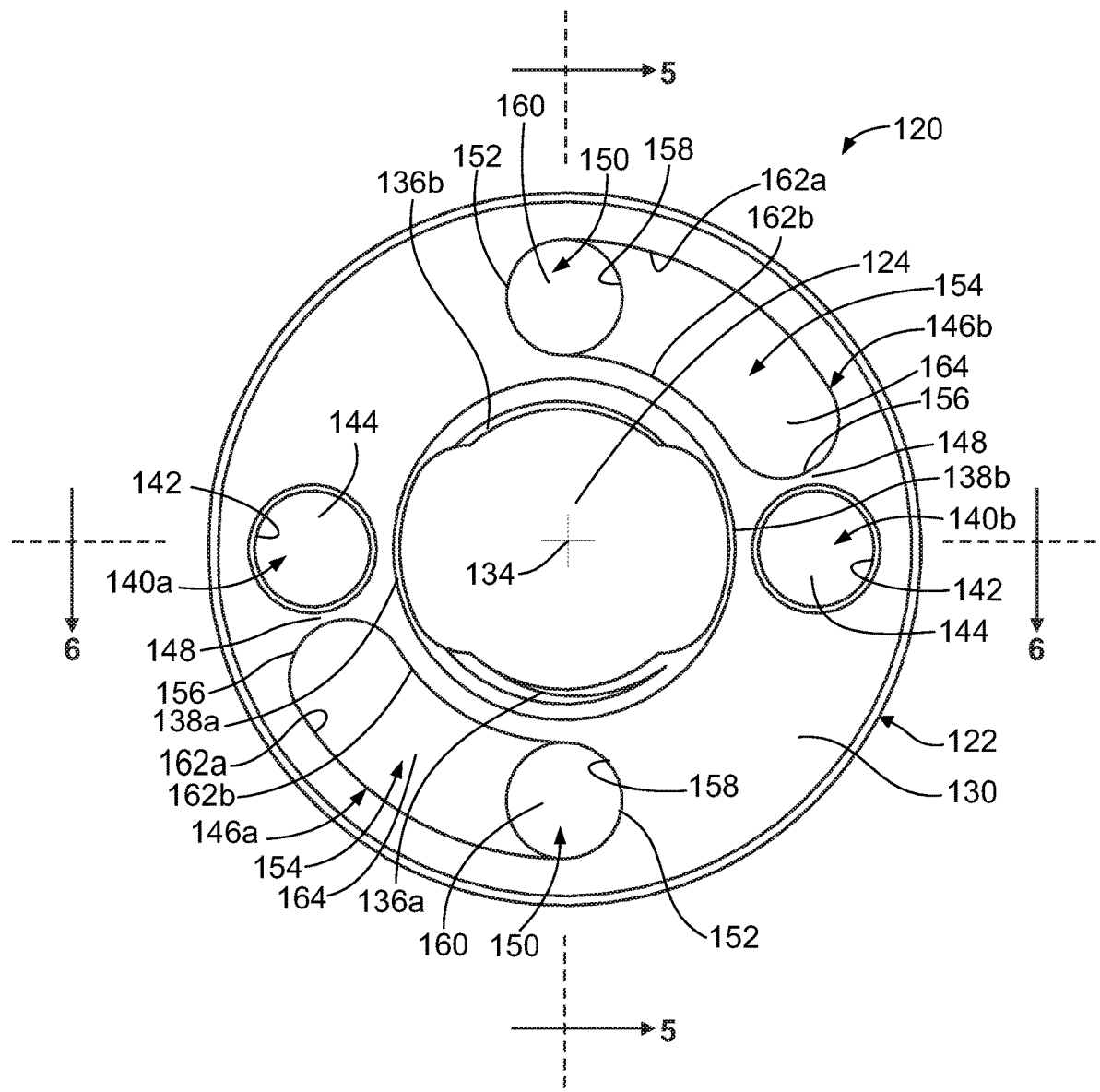
FIG. 3 depicts a proximal end plan view of the cutting device.
Figure 4:
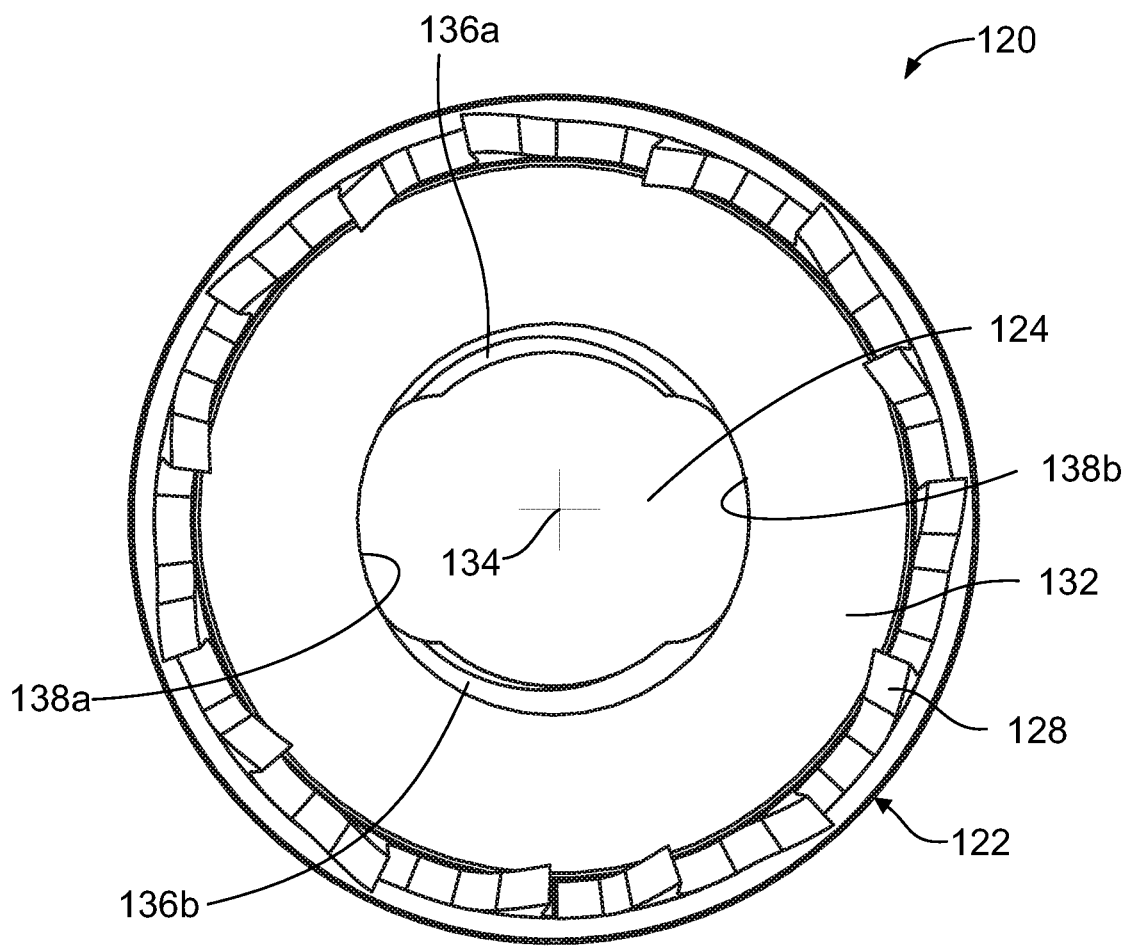
FIG. 4 depicts a distal end plan view of the cutting device.
Figure 5:
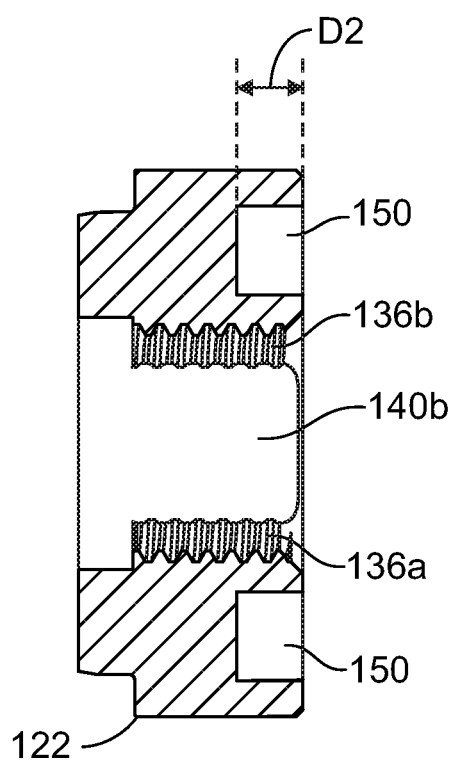
FIG. 5 depicts a cross-sectional view of the cutting device along line 5-5 of FIG. 3.
Figure 6:
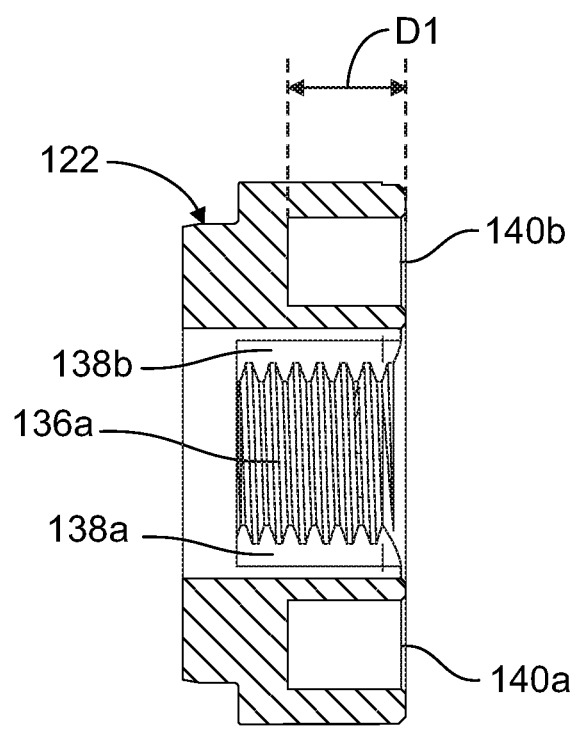
FIG. 6 depicts a cross-sectional view of the cutting device along line 6-6 of FIG. 3.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

In this description, use of the word "proximal" shall refer to elements, surfaces or positions closest to a user and "distal" shall refer to elements, surfaces or positions furthest from a user.

Figure 7:
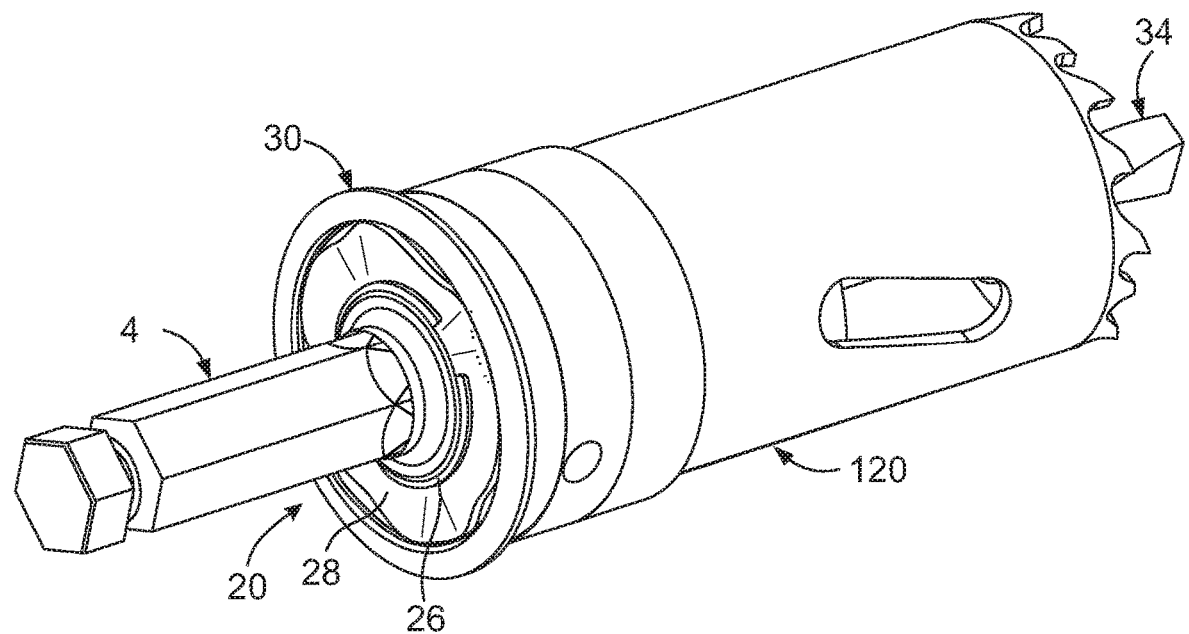
FIG. 7 depicts a perspective view of the cutting device and an example arbor assembly in an assembled condition, and shown from the proximal end.
Figure 8:
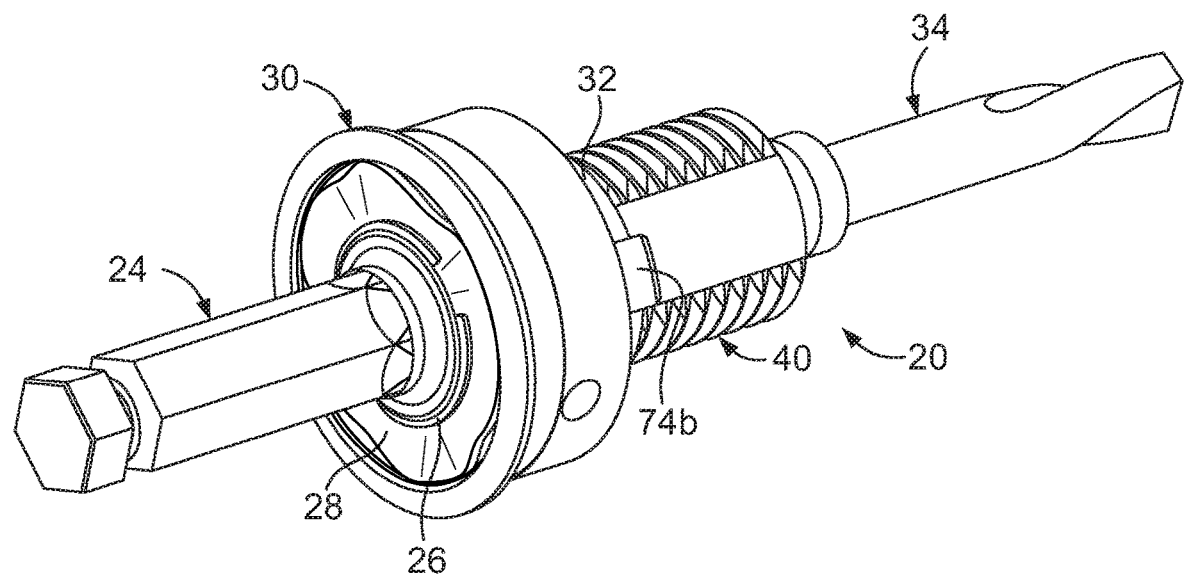
FIG. 8 depicts a perspective view of the example arbor assembly shown in FIG. 7 and shown from the proximal end.
Figure 9:
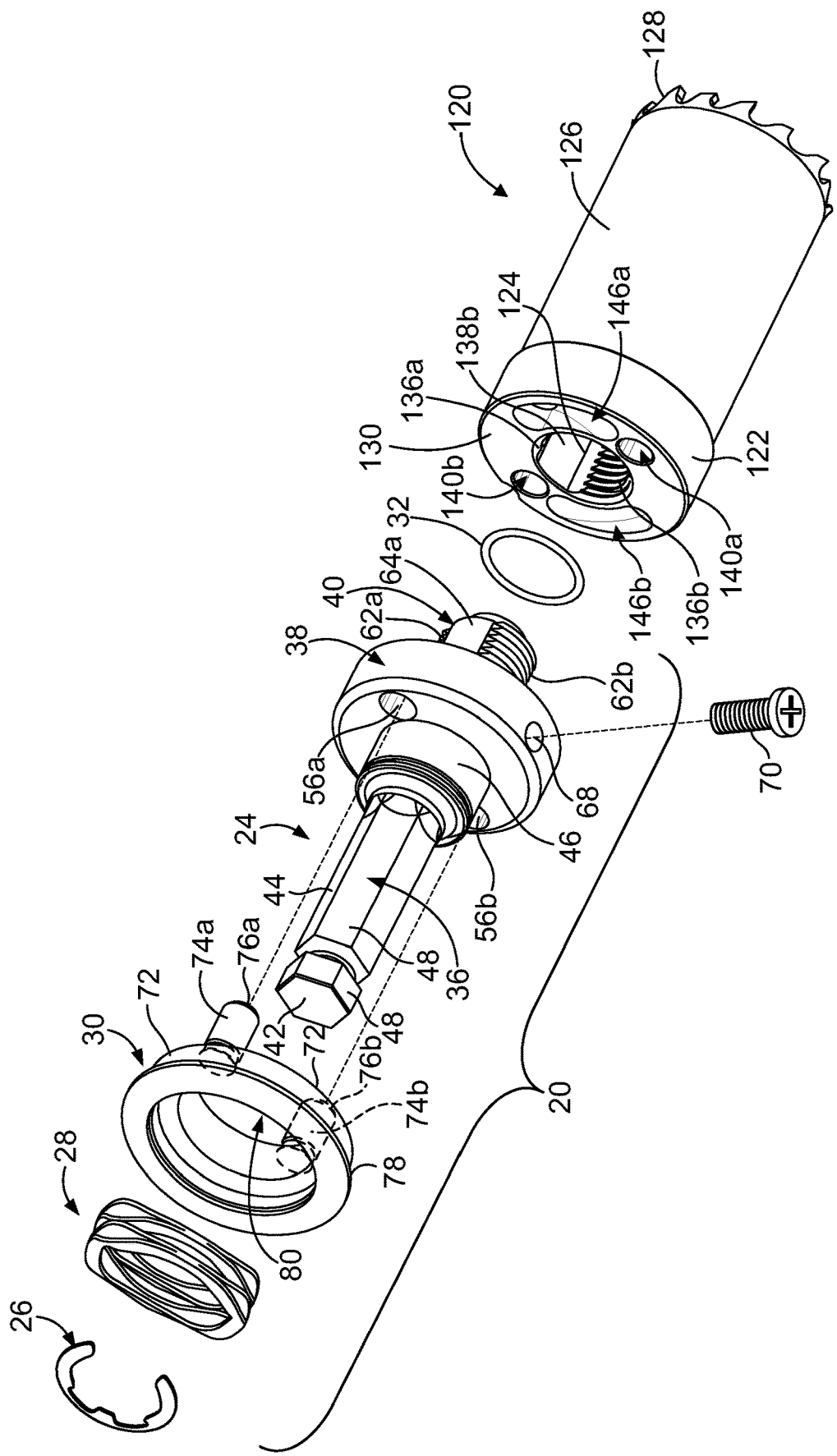
FIG. 9 depicts an exploded perspective view of the cutting device and example arbor assembly shown in FIG. 7.

A cutting device 120, such as a cutter or a hole saw, is removably mounted on an arbor assembly 20 for use by an operator to cut a workpiece (not shown). The cutting device 120 can be quickly mounted to and dismounted from the arbor assembly 20. The cutting device 120 is best shown in FIGS. 1-6, and the arbor assembly 20 is best shown in FIG. 7.

The cutting device 120 is formed from a back plate 122 having a proximal end and a distal end, a central through hole 124 therethrough extending from the proximal end to the distal end, and a blade 126 extending from the distal end of the back plate 122 and which terminates in a plurality of teeth 128. The back plate 122 has an outer end surface 130 at its proximal end which in some embodiments is planar. In an embodiment, the back plate 122 is circular, and the blade 126 is cylindrical such that a slug receiving passageway 132 is formed therein. A longitudinal centerline 134 is defined through the center of the cutting device 120. In an embodiment, the back plate 122 and the blade 126 are formed as two separate components and then affixed together. In an embodiment, the back plate 122 and the blade 126 are integrally formed.

In an embodiment, the through hole 124 is generally cylindrically-shaped and has threaded wall portions 136a, 136b which alternate with unthreaded wall portions 138a, 138b. In an embodiment, two threaded wall portions 136a, 136b and two unthreaded wall portions 138a, 138b are provided. In an embodiment, two threaded wall portions 136a, 136b and two unthreaded wall portions 138a, 138b are provided, the threaded wall portions 136a, 136b are diametrically opposed and the unthreaded wall portions 138a, 138b are diametrically opposed. While two sets of the threaded and unthreaded wall portions 136a, 136b, 138a, 138b are shown, more than two of each wall portion 136a, 136b, 138a, 138b may be provided. For example, in an embodiment, three threaded wall portions are provided, which alternate with two unthreaded wall portions. For example, in an embodiment, two threaded wall portions are provided, which alternate with three unthreaded wall portions. For example, in an embodiment, four threaded and unthreaded wall portions are provided which alternate with each other.

At least two blind pin locking recesses 140a, 140b extend distally from the outer end surface 130 of the back plate 122 and into the back plate 122, and are spaced radially outwardly from the centerline 134. Each pin locking recess 140a, 140b has a side wall 142 which extends distally from the outer end surface 130 of the back plate 122 and into the back plate 122 and which terminates in a distal wall 144. In some embodiments, the pin locking recesses 140a, 140b are radially outwardly from the centerline 134 such that the pin locking recesses 140a, 140b fall along the same bolt hole circle. In some embodiments, the pin locking recesses 140a, 140b are radially outwardly from the centerline 134 such that the pin locking recesses 140a, 140b fall along the same bolt hole circle and the pin locking recesses 140a, 140b are equally spaced from each other. In some embodiments, the pin locking recesses 140a, 140b are spaced radially outwardly from the centerline 134, but the pin locking recesses 140a, 140b do not fall along the same bolt hole circle. In some embodiments, the pin locking recesses 140a, 140b are spaced radially outwardly from the centerline 134, but the pin locking recesses 140a, 140b do not fall along the same bolt hole circle and the pin locking recesses 140a, 140b are equally spaced from each other. In some embodiments, the distal wall 144 defines a planar surface which is perpendicular to the centerline 134. In some embodiments, each side wall 142 is cylindrical and each distal wall 144 is circular. Each pin locking recess 140a, 140b defines a depth D1, see FIG. 6.

Each pin locking recess 140a, 140b has an associated pin engaging ramp 146a, 146b which is proximate to, but spaced from the respective pin locking recess 140a, 140b around the perimeter of the back plate 122, such that a surface portion 148 of the outer end surface 130 is provided between the pin locking recess 140a, 140b and its associated pin engaging ramp 146a, 146b. Each pin engaging ramp 146a, 146b extends distally from the outer end surface 130 of the back plate 122 and into the back plate 122, and is spaced radially outwardly from the centerline 134. Each pin engaging ramp 146a, 146b has an end section 150 which is spaced from its associated pin locking recess 140a, 140b around the perimeter of the back plate 122 and defines a first end 152 of each pin engaging ramp 146a, 146b and a ramp section 154 which extends from the end section 150 to the outer end surface 130 of the back plate 122 and defines a second end 156 of each pin engaging ramp 146a, 146b. In some embodiments, the end section 150 is offset 90 degrees from its associated pin locking recess 140a, 140b. The second end 156 is adjacent to, but spaced from, the associated pin locking recess 140a, 140b by the surface portion 148. The end section 150 defines the distal most point of each pin engaging ramp 146a, 146b (the portion of each pin engaging ramp 146a, 146b which is farthest from the outer end surface 130) and the second end 156 defines the proximal most point of each pin engaging ramp 146a, 146b (the portion of each pin engaging ramp 146a, 146b which is closest to the outer end surface 130). The ramp section 154 slopes from the end section 150 to the second end 156. In an embodiment, the ramp section 154 curves in an arc as it progresses around the perimeter of the back plate 122 such that the ramp section 154 falls along an imaginary line which follows the radius extending from the centerline 134 of the back plate 122.

The end section 150 of each pin engaging ramp 146a, 146b has a side wall 158 which extends from the outer end surface 130 of the back plate 122 and into the back plate 122 and which terminates in a distal wall 160. In some embodiments, the distal wall 160 defines a planar surface and is perpendicular to the centerline 134. In some embodiments, the side wall 158 is generally cylindrical and the distal wall 160 is circular. The end section 150 of each pin engaging ramp 146a, 146b defines a depth D2, see FIG. 5. In an embodiment, the depth D1 defined by the pin locking recess 140a, 140b is greater than the depth D2 defined by the end sections 150 of the pin engaging ramps 146a, 146b. In an embodiment, the depth D2 defined by the end sections 150 of the pin engaging ramps 146a, 146b is greater than the depth D1 defined by the pin locking recess 140a, 140b. In an embodiment, the depth D1 defined by the pin locking recess 140a, 140b is equal to or substantially equal to the depth D2 defined by the end sections 150 of the pin engaging ramps 146a, 146b.

The ramp section 154 of each pin engaging ramp 146a, 146b has a pair of side walls 162a, 162b which extend from the end section 150, an end which is provided at second end 156, and a base wall 164 extending between the side walls 162a, 162b. In an embodiment, the base wall 164 is planar in cross-section between the side walls 156a, 156b. In an embodiment, the base wall 164 is curved in cross-section between the side walls 156a, 156b.

In an embodiment and as shown, the pin locking recesses 140a, 140b are radially outwardly of the respective unthreaded wall portion 138a, 138b, the end section 150 of each pin engaging ramp 146a, 146b is radially outwardly of the respective threaded wall portion 136a, 136b, and the second end 156 of each pin engaging ramp 146a, 146b is radially outwardly of the respective unthreaded wall portion 138a, 138b. In an embodiment, the locking recesses 140a, 140b are radially outwardly of the respective threaded wall portion 136a, 136b, the end section 150 of each pin engaging ramp 146a, 146b is radially outwardly of the respective unthreaded wall portion 138a, 138b, and the second end 156 of each pin engaging ramp 146a, 146b is radially outwardly of the respective threaded wall portion 136a, 136b. In an embodiment, two pin locking recesses 140a, 140b and two pin engaging ramps 146a, 146b are provided. In an embodiment and as shown, two pin locking recesses 140a, 140b are provided and are diametrically opposed and two pin engaging ramps 146a, 146b are provided and are diametrically opposed. In an embodiment, more than two pin locking recesses 140a, 140b and two pin engaging ramps 146a, 146b are provided.

An example of an arbor assembly 20 with which the cutting device 120 can be used is shown in FIGS. 7-12. In an embodiment, the arbor assembly 20 is the arbor assembly from U.S. Pat. No. 9,248,514, the contents of which are incorporated herein by reference, and that is the arbor assembly 20 described herein and that is the arbor assembly 20 described herein. While the arbor assembly 20 from U.S.

Pat. No. 9,248,514 is shown and described herein, it is to be understood that other arbor assemblies with retractable pin sleeves may be used.

In an embodiment, the arbor assembly 20 includes an arbor 24, a retainer 26, a spring 28 mounted on the arbor 24, a retractable pin sleeve 30 and an optional O-ring 32. The arbor assembly 20 is shown with a pilot drill bit 34 mounted to the arbor 24 in FIGS. 8 and 10.

The arbor 24 generally includes an elongated shank 36, a collar 38 and a nose 40. The shank 36 extends from a proximal end 42 of the arbor 24 to the collar 38. The collar 38 extends from the shank 36 to the nose 40 which defines a distal end 43 of the arbor 24. The shank 36 and the collar 38 receive the pin sleeve 30 as will be described herein. The shank 36 has a first section 44 extending from the proximal end 42 of the arbor 24 and a second section 46 extending distally from the first section 44 to the collar 38. The first section 44 includes surfaces 48, for example to form a hexagon, to be received by the chuck (not shown) of an electric drill (not shown) to provide rotation to the arbor assembly 20. A centerline 54 is defined extending from the proximal end 42 to the distal end 43 of the arbor 24. The collar 38 has an outer diameter which is greater than the second section 46 of the shank 36. The collar 38 has through-holes 56a, 56b extending therethrough from a proximal end 37 of the collar 38 to a distal end 39 of the collar 38. In some embodiments, the through-holes 56a, 56b are diametrically opposed to each other. The nose 40 extends distally from the collar 38 and forms the distal end 43 of the arbor 24. In some embodiments, the nose 40 has a diameter which is less than the diameter of the collar 38. The nose 40 has a geometry on its outer surface which mates with the geometry of the through hole 124 of the back plate 122. Thus, the nose 40 has threaded portions 62a, 62b which alternate with unthreaded portions 64a, 64b on the external surface thereof. A drill bit passageway 66 extends from the distal end 43 of the arbor 24, through the nose 40, through the collar 38 and into the second section 46 of the shank 36. A set screw passageway 68 extends through the collar 38, transverse to the drill bit passageway 66, and intersects the drill bit passageway 66. A drill bit 34 can be inserted into the drill bit passageway 66, and a set screw 70 inserted into the set screw passageway 68 to hold the drill bit 34 in place in a known manner. The pin sleeve 30 includes a main body 72 having a proximal end and a distal end, and pins 74a, 74b extending from the distal surface of the main body 72. While two pins 74a, 74b are shown and described as in U.S. Pat. No. 9,248,514, more than two pins may be provided, along with respective through-holes in the collar 38. Each pin 74a, 74b terminates in an end 76a, 76b at its distal end. An arbor passageway 80 extends through the axial center of the pin sleeve 30 from the proximal end of the pin sleeve 30 to the distal end of the pin sleeve 30. The pins 74a, 74b are spaced from the arbor passageway 80.

Figure 10:
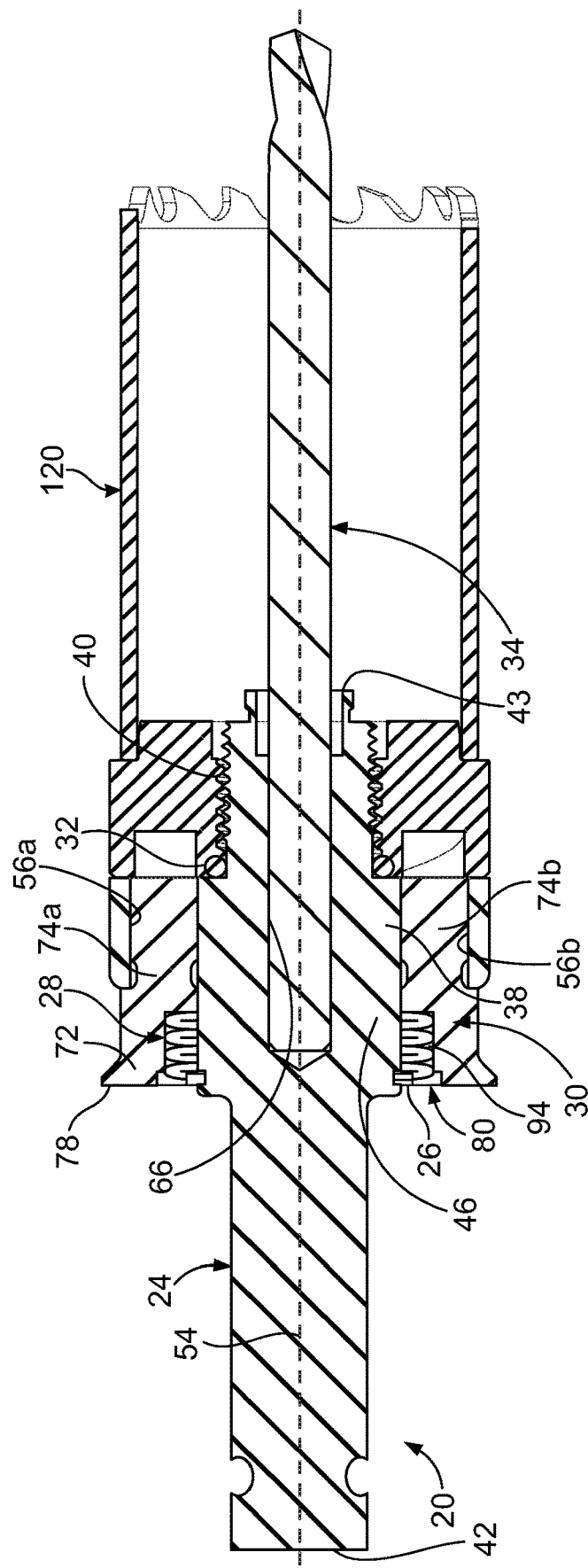
FIG. 10 depicts a cross-sectional view of the cutting device and the example arbor assembly shown in FIG. 7 in an assembled condition.
Figure 11:
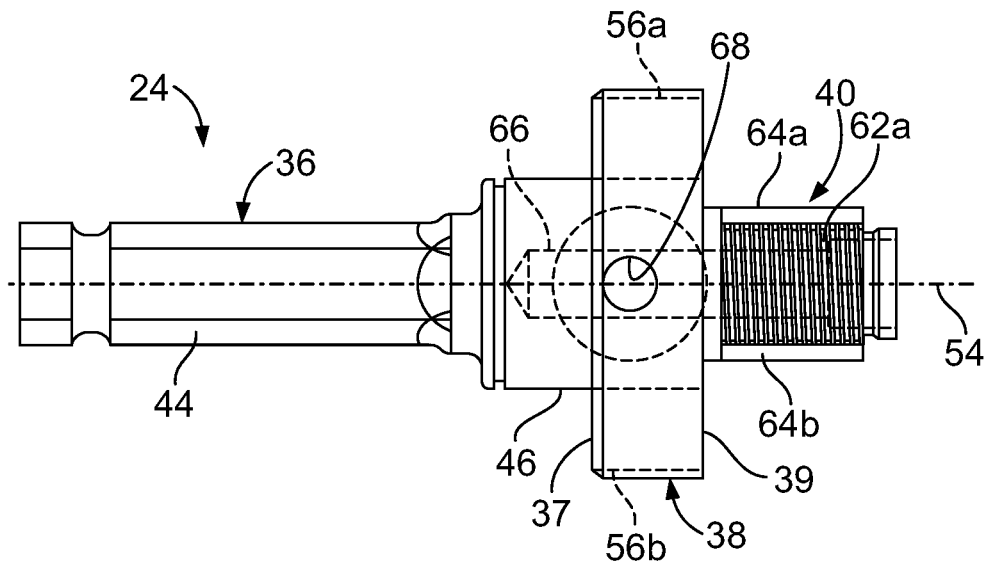
FIG. 11 depicts a side elevation view of the example arbor assembly shown in FIG. 7.
Figure 12:
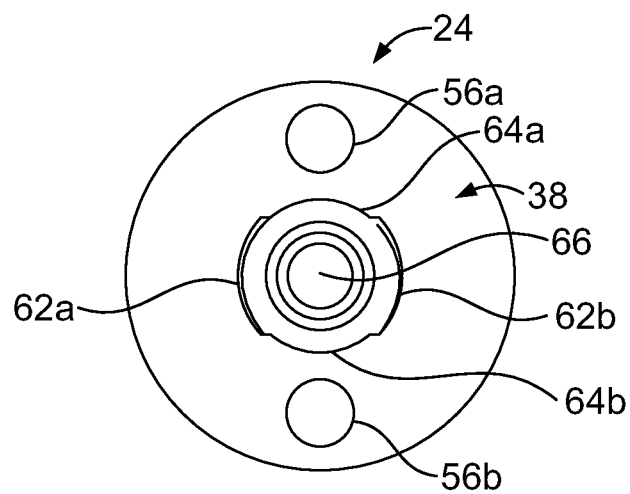
FIG. 12 depicts an end elevation view of the example arbor assembly shown in FIG. 7.

Assembly of the arbor assembly 20 begins by mounting the pin sleeve 30 on the shank 36 of the arbor 24. The second section 46 of the shank 36 seats in the arbor passageway 80 of the pin sleeve 30. As a result, a space 94 is formed between the shank 36 and the wall forming the arbor passageway 80. The proximal end 37 of the collar 38 seats against the distal surface of the main body 72 of the pin sleeve 30 and the pins 74a, 74b pass through the through-holes 56a, 56b in the collar 38 and extend outwardly from the distal end 39 of the collar 38. The proximal end of the second section 46 of the shank 36 generally aligns with the proximal end of the pin sleeve 30. The spring 28 is passed over the shank 36 of the arbor 24 until the spring 28 surrounds the second section 46 of the shank 36 and seats in the second section 82 of the arbor passageway 80. As shown in FIG. 10, the spring 28 fills the space 94 between the arbor 24 and the pin sleeve 30. The retainer 26 is mounted on the shank 36 to secure the spring 28 to the arbor 24 and to the pin sleeve 30. The nose 40 of the arbor 24 is passed through the O-ring 32, if provided, until the O-ring 32 abuts against the distal end 39 of the collar 38.

The pin sleeve 30 can move toward the proximal end 42 of the arbor assembly 20, axially along the centerline of the arbor assembly 20 (which aligns with the centerline 54 of the arbor 24), but cannot disengage from the arbor 24 as a result of being secured to the arbor 24 by the spring 28 and its retainer 26. The user can move the pin sleeve 30 axially toward the proximal end 42, by grasping the main body 72 of the pin sleeve 30 and pulling the pin sleeve 30 proximally. This causes the spring 28 to compress and the pins 74a, 74b to retract into the through-holes 56a, 56b in the collar 38. The pin sleeve 30 cannot be moved so far proximally along the shank 36 to completely disengage the pins 74a, 74b from the through-holes 56a, 56b as a result of the geometry of the components. When the pulling force is released, the spring 28 returns to its naturally expanded state causing the pins 74a, 74b to extend outwardly from the distal end 39 of the collar 38.

The pilot drill bit 34 is attached to the arbor assembly 20 by inserting the pilot drill bit 34 into the pilot bit passageway 66 in the shank 36. The set screw 70 is threaded through the set screw passageway 68 and the end of the set screw 70 engages the pilot drill bit 34 to secure the pilot drill bit 34 to the arbor assembly 20 in a known manner.

The cutting device 120 is attached to the arbor assembly 20 by passing the nose 40 of the arbor 24 through the through hole 124 in the back plate 122 of the cutting device 120. The threaded portions 62a, 62b of the nose 40 of the arbor 24 are aligned with the unthreaded wall portions 138a, 138b of the back plate 122 of the cutting device 120, and the unthreaded portions 64a, 64b of the nose 40 of the arbor 24 are aligned with the threaded wall portions 136a, 136b of the back plate 122 of the cutting device 120. This enables the nose 40 of the arbor 24 to easily slide into the through hole 124 of the cutting device 120. When the cutting device 120 is being attached to the arbor assembly 20, the pins 74a, 74b on the arbor 24 seat within the end section 150 of the respective pin engaging ramp 146a, 146b. The pins 74a, 74b are inserted into the end sections 150 until the ends 76a, 76b of the pins 74a, 74b engage the respective distal wall 160. Once the nose 40 is inserted, the arbor assembly 20 is held stationary and the cutting device 120 is then rotated relative to the arbor assembly 20, or the cutting device 120 is held stationary and the arbor assembly 20 is then rotated relative to the cutting device 120. As the arbor assembly 20 and cutting device 120 are rotated relative to each other, the threaded portions 62a, 62b of the nose 40 of the arbor 24 engage with the threaded wall portions 136a, 136b of the back plate 122 of the cutting device 120. In some embodiments, this rotation is 90 degrees. This rotation also causes the pins 74a, 74b on the arbor 24 to slide along the ramp sections 154 of the pin engaging ramps 146a, 146b, thereby causing the pin sleeve 30 to move toward the proximal end 42 of the arbor assembly 20. This causes the spring 28 to compress and the pins 74a, 74b to retract into the through-holes 56a, 56b in the collar 38. The pin sleeve 30 cannot be moved so far proximally along the shank 36 to completely disengage the pins 74a, 74b from the through-holes 56a, 56b as a result of the geometry of the components. The pins 74a, 74b slide along the ramp sections 154, along the surface portion 148 of the outer end surface 130 and align with the pin locking recesses 140a, 140b. Once the pins 74a, 74b align with the pin locking recesses 140a, 140b, the spring 28 expands, thereby causing the pins 74a, 74b to extend outwardly from the distal end 39 of the collar 38 and seat within the pin locking recesses 140a, 140b in the cutting device 120. This engagement of the pins 74a, 74b of the arbor assembly 20 with the cutting device 120 prevents the rotation of the cutting device 120 relative to the arbor assembly 20 and the mated threads in the threaded portions 62a, 62b, 136a, 136b prevent the cutting device 120 from coming off during use. This engagement of the pins 74a, 74b of the arbor assembly 20 with the cutting device 120, in combination with the spring 28, provides a desired spacing between the distal end 39 of the collar 38 and the outer end surface 130 of the back plate 122; the outer end surface 130 forming a proximal end of the cutting device 120 when the cutting device 120 is assembled with the arbor assembly 20. In some embodiments, this spacing is approximately 5 to 10 thousandths of an inch. In other embodiments, this spacing is approximately 55 to 65 thousandths of an inch. If the O-ring 32 is provided, the O-ring 32 is compressed between the cutting device 120 and the arbor 24.

In use, as the shank 36 is rotated by the drill, the pilot drill bit 34 is also rotated due to the retention of the pilot drill bit 34 within the shank 36. The arbor 24 transfers rotational force from the drill to the cutting device 120. The O-ring 32, if provided, aids in reducing vibrations as the cutting device 120 is rotated and advanced within the workpiece.

To disengage the cutting device 120 from the arbor assembly 20, the user grasps the main body 72 of the pin sleeve 30 and pulls the pin sleeve 30 proximally. This causes the spring 28 to compress and the pins 74a, 74b to retract from engagement with the pin locking recesses 140a, 140b of the cutting device 120 and into the through-holes 56a, 56b in the collar 38. While the pin sleeve 30 is held in this position, the cutting device 120 or arbor 24 is rotated in the reverse direction thereby disengaging the threaded portions 62a, 62b of the nose 40 of the arbor 24 from the threaded wall portions 136a, 136b of the cutting device 120. The pins 74a, 74b slide along the surface portions 148 of the outer end surface 130, along the ramp sections 154, and into the end sections 150 of the pin engaging ramps 146a, 146b. As the pins 74a, 74b slide along the ramp sections 154, and into the end sections 150 of the pin engaging ramps 146a, 146b, the spring 28 expands (but may not fully expand) and the pins 74a, 74b extend out of the through-holes 56a, 56b in the collar 38. This aligns the threaded portions 62a, 62b of the nose 40 of the arbor 24 with the unthreaded wall portions 138a, 138b of the cutting device 120, and the unthreaded portions 64a, 64b of the nose 40 of the arbor 24 with the threaded wall portions 136a, 136b of the cutting device 120. Thereafter, the cutting device 120 is easily pulled off of the arbor assembly 20.

Another cutting device having a different tooth configuration can be easily attached to the arbor assembly 20 in the same manner. This provides a quick and easy changeover for different cutting devices.

If desired, a pilot hole can be created in the workpiece with the drill bit 34 attached to the arbor assembly 20 and without the cutting device 120 attached to the arbor assembly 20. After formation of the pilot hole, the cutting device 120 can be easily attached to the arbor assembly 20 as described herein.

As a result of the configuration of the cutting device 120, the operator can only rotate the cutting device 120 in one direction to engage the cutting device 120 and the arbor assembly 20 together. In the embodiment shown in the drawings, the operator can only rotate the cutting device 120 in a clockwise direction. This eliminates the required axial and rotational movement to assembly the cutting device to the arbor assembly in the prior art designs. The pin engaging ramps 146a, 146b can be reversed and the pin locking recesses 140a, 140b provided on the opposite side of the pin engaging ramps 146a, 146b such that a counterclockwise rotation of the cutting device 120 is affected to engage the cutting device 120 with the arbor assembly 20.

The pin engaging ramps 146a, 146b provide a required position of the pin sleeve 30 relative to the cutting device 120 before rotation of the cutting device 120 or arbor assembly 20 can be commenced. This properly times the threaded portions 62a, 62b of the nose 40 of the arbor 24 with the threaded wall portions 136a, 136b of the cutting device 120 so that a correct engagement is achieved. In the embodiment shown in the drawings, each of the threaded portions 62a, 62b of the nose 40 of the arbor 24 and the threaded wall portions 136a, 136b of the cutting device 120 are a single helix thread. In an embodiment, each of the threaded portions 62a, 62b of the nose 40 of the arbor 24 and the threaded wall portions 136a, 136b of the cutting device 120 have a double helix thread thereon to allow the cutting device 120 to be positioned at 0 degrees or at 180 relative to the nose 40 to engage the threaded wall portions 136a, 136b of the cutting device 120 with the threaded portions 62a, 62b of the nose 40 of the arbor 24.

Indicia or marking 300 may be provided on the cutting device 120 to assist in the direction of rotation as described herein so that the pins 74a, 74b will slide along the pin engaging ramps 146a, 146b. Indicia or marking 302 may be provided on the cutting device 120 to assist in identifying the positions of the pin engaging ramps 146a, 146b into which the pins 74a, 74b are inserted as described herein. In some embodiments, indicia or marking may be provided on the cutting device 120 and corresponding indicia or marking may be provided on the arbor assembly 20. The indicia or marking may be aligned respectively on the cutting device 120 and arbor assembly 20, respectively, such that when the nose 40 of the arbor 24 is passed through the through hole 124 in the back plate 122 of the cutting device 120 such that the indicia or marking are aligned, the pins 74a, 74b are positioned over the pin engaging ramps 146a, 146b. In some embodiments, the indicia or marking may be aligned respectively on the cutting device 120 and arbor assembly 20, respectively, such that when the nose 40 of the arbor 24 is passed through the through hole 124 in the back plate 122 of the cutting device 120 such that the indicia or marking are aligned, the pins 74a, 74b are positioned over the end sections 150 of the pin engaging ramps 146a, 146b. Accordingly, when engaging the cutting device 120 with arbor assembly 20, the user may use the corresponding indicia or marking on the cutting device 120 and the arbor assembly 20 of such embodiments to facilitate initial alignment of the cutting device 120 and the arbor assembly 20 relative to one other and to visually confirm proper initial alignment between the pins 74a, 74b and the pin engaging ramps 146a, 146b.

While the pins 74a, 74b are shown and described as cylindrical in U.S. Pat. No. 9,248,514, the pins 74a, 74b may take other forms, such as a having a square cross-section; the pin locking recess 140a, 140b and the associated pin engaging ramp 146a, 146b are formed to accommodate these other cross-sections. In an embodiment, the pins 74a, 74b have the same dimensions. In an embodiment, the pins 74a, 74b have differing dimensions; the pin locking recess 140a, 140b and the associated pin engaging ramp 146a, 146b are formed to accommodate such differing dimensions.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cutting device for use with an arbor assembly comprising:
    a blade having a proximal end and a distal end, and a plurality of teeth at the distal end thereof; and
    a back plate at the proximal end of the blade,
        the back plate having a proximal end and a distal end, the proximal end of the back plate forming an outer end surface,
        a central through hole extending from the proximal end to the distal end of the back plate, the central through hole having alternating threaded wall portions and unthreaded wall portions which extend from the proximal end to the distal end of the back plate
        a first pin engaging ramp having side walls extending distally from the outer end surface and a sloped base wall extending between the side walls, the first pin engaging ramp being spaced apart from the through hole,
        a first pin locking recess having a side wall extending distally from the outer end surface and an end surface at a distal end thereof, the first pin locking recess being spaced apart from the through hole, the first pin locking recess being spaced apart from the first pin engaging ramp by a first surface portion of the outer surface,
        a second pin engaging ramp having side walls extending distally from the outer end surface and a sloped base wall extending between the side walls thereof, the second pin engaging ramp being spaced apart from the through hole, and
        a second pin locking recess having a side wall extending distally from the outer end surface and an end surface at a distal end thereof, the second pin locking recess being spaced apart from the through hole, the second pin locking recess being spaced apart from the first pin engaging ramp by a second surface portion of the outer surface, the second pin locking recess being spaced being spaced apart from the second pin engaging ramp by a third surface portion of the outer surface,
        wherein the pin engaging ramps only allow the cutting device to be rotated relative to the arbor assembly in one direction to engage the cutting device with the arbor assembly.

2. The cutting device as defined in claim 1, wherein each pin engaging ramp further includes a planar end wall at a first end of the sloped base wall, the end wall being perpendicular to a longitudinal centerline of the back plate which passes through the central through hole.

3. The cutting device as defined in claim 2, wherein the end wall of the first pin engaging ramp is offset 90 degrees from the first pin locking recess, and the end wall of the second pin engaging ramp is offset 90 degrees from the second pin locking recess.

4. The cutting device as defined in claim 2, wherein each sloped base wall curves in an arc.

5. The cutting device as defined in claim 4, wherein each sloped base wall falls along an imaginary line which follows a radius extending from the longitudinal centerline.

6. The cutting device as defined in claim 2, wherein each planar end wall is circular.

7. The cutting device as defined in claim 2, wherein each pin locking recess defines a first depth, and the end wall of each pin engaging ramp defines a second depth, wherein the first depth is greater than the second depth.

8. The cutting device as defined in claim 2, wherein each pin locking recess defines a first depth, and the end wall of each pin engaging ramp defines a second depth, wherein the second depth is greater than the first depth.

9. The cutting device as defined in claim 2, wherein the base wall of each pin engaging ramp is planar in cross-section between the side walls.

10. The cutting device as defined in claim 2, wherein the base wall of each pin engaging ramp is curved in cross-section between the side walls.

11. The cutting device as defined in claim 2, further comprising indicia on the back plate which indicates to a user where the end wall is located.

12. The cutting device as defined in claim 1, wherein the first pin locking recess is radially outward of one of the unthreaded wall portions and the second pin locking recess is radially outward of another one of the unthreaded wall portions.

13. The cutting device as defined in claim 1, further comprising indicia on the back plate which indicates to a user which direction to rotate the cutting device.

14. The cutting device as defined in claim 1, wherein the blade is cylindrical.

* * * * *